United States Patent
King et al.

(10) Patent No.: US 12,344,036 B2
(45) Date of Patent: Jul. 1, 2025

(54) FLUID MANAGEMENT SYSTEM FOR A DRIVETRAIN

(71) Applicant: DEERE & COMPANY, Moline, IL (US)

(72) Inventors: Kevin R. King, Bettendorf, IA (US); Nathanael K. Rehn, Waterloo, IA (US); Curtis P. Thoreson, Janesville, IA (US)

(73) Assignee: DEERE & COMPANY, Moline, IL (US)

( * ) Notice: Subject to any disclaimer, the term of this patent is extended or adjusted under 35 U.S.C. 154(b) by 12 days.

(21) Appl. No.: 18/358,692

(22) Filed: Jul. 25, 2023

(65) Prior Publication Data
US 2025/0033410 A1 Jan. 30, 2025

(51) Int. Cl.
| | | |
|---|---|---|
| B60B 35/00 | (2006.01) | |
| F16N 7/40 | (2006.01) | |
| F16N 19/00 | (2006.01) | |
| F16N 25/00 | (2006.01) | |

(52) U.S. Cl.
CPC ............ B60B 35/00 (2013.01); F16N 7/40 (2013.01); F16N 19/006 (2013.01); F16N 25/00 (2013.01); *B60B 2900/561* (2013.01); *F16N 2210/04* (2013.01)

(58) Field of Classification Search
CPC .......... F16N 7/40; F16N 19/006; F16N 25/00; F16H 57/0443; F16H 57/045; F16H 57/0452; F16H 57/0453; B60B 2900/561; B60B 35/00
See application file for complete search history.

(56) References Cited

U.S. PATENT DOCUMENTS

| | | | | |
|---|---|---|---|---|
| 1,485,729 A | * | 3/1924 | Sommerfeldt | F16N 19/006 184/103.2 |
| 2,322,463 A | * | 6/1943 | Mcdonald | F16N 7/40 184/6.13 |
| 3,800,913 A | * | 4/1974 | Schmitt | F01M 1/12 74/606 R |
| 4,346,786 A | * | 8/1982 | Midgley | F01M 11/067 184/6.4 |

(Continued)

FOREIGN PATENT DOCUMENTS

| | | |
|---|---|---|
| DE | 10051356 A1 | 4/2002 |
| EP | 3312477 A1 | 4/2018 |

(Continued)

OTHER PUBLICATIONS

German Search Report issued in application No. 102024116233.3 dated Jan. 14, 2025, 08 pages.

*Primary Examiner* — Minh Truong

(57) ABSTRACT

A fluid management system for a drivetrain includes a first reservoir, a second reservoir, a main suction line, and a second suction line. The first reservoir is positioned in a lower portion of a transmission. The first reservoir has a preselected fluid level. The second reservoir is positioned in a lower portion of the transmission. The second reservoir is separated from the first reservoir by a barrier having an opening. The main suction line has an opening positioned in a lower portion the first reservoir below the preselected fluid level. The second suction line has an opening positioned in a lower portion of the second reservoir.

18 Claims, 11 Drawing Sheets

(56) References Cited

U.S. PATENT DOCUMENTS

| | | | |
|---|---|---|---|
| 4,616,609 A * | 10/1986 | Munch | F01M 11/0004 |
| | | | 123/196 R |
| 6,367,248 B1 | 4/2002 | Langston et al. | |
| 6,371,158 B1 | 4/2002 | Hou et al. | |
| 8,230,973 B2 | 7/2012 | Rhein et al. | |
| 9,297,322 B2 * | 3/2016 | Hokuto | F02D 41/22 |
| 9,334,769 B2 | 5/2016 | Norrick et al. | |
| 9,732,840 B2 | 8/2017 | Harreau | |
| 10,253,868 B2 | 4/2019 | Kiyokami et al. | |
| 10,948,070 B2 | 3/2021 | Kuhl et al. | |
| 11,421,775 B2 | 8/2022 | Reid et al. | |
| 11,585,428 B2 | 2/2023 | Reid et al. | |
| 2009/0014248 A1 * | 1/2009 | Yamashita | F16H 57/0447 |
| | | | 184/26 |
| 2016/0341299 A1 | 11/2016 | Gerges et al. | |
| 2016/0369853 A1 * | 12/2016 | Sugiura | F01M 1/10 |
| 2019/0219149 A1 * | 7/2019 | Olson | B64D 35/00 |
| 2023/0030818 A1 * | 2/2023 | Biehler | F16H 57/0436 |
| 2023/0118512 A1 | 4/2023 | McClain et al. | |

FOREIGN PATENT DOCUMENTS

| | | |
|---|---|---|
| JP | 2003166630 A | 6/2003 |
| JP | 2015218867 A | 12/2015 |
| JP | 2019138434 A | 9/2019 |

\* cited by examiner

FLUID MANAGEMENT SYSTEM FOR A DRIVETRAIN

FIELD OF THE DISCLOSURE

The present disclosure relates to a fluid management system for a drivetrain.

BACKGROUND

Work vehicles commonly include a transmission and front and rear axle assemblies. During work vehicle operation, a supply pump circulates oil through a distribution circuit, which provides lubrication to rotating components, such as gears, clutches, and axles. The distribution circuit can include an oil sump or reservoir.

SUMMARY

According to an aspect of the present disclosure, a fluid management system for a drivetrain includes a first reservoir positioned in a lower portion of a transmission, the first reservoir having a preselected fluid level, a second reservoir positioned in a lower portion of a transmission, the second reservoir separated from the first reservoir by a barrier having an opening, a main suction line having an opening positioned in a lower portion the first reservoir below the preselected fluid level, and a second suction line having an opening positioned in a lower portion of the second reservoir.

According to an aspect of the present disclosure, the main suction line is in fluid communication with a front axle and a rear axle.

According to an aspect of the present disclosure, the main suction line is in fluid communication with a third reservoir.

According to an aspect of the present disclosure, the second suction line is in fluid communication with a front axle and a rear axle.

According to an aspect of the present disclosure, the fluid management system includes a transfer pump in fluid communication with the first reservoir, a front axle, and a rear axle, and the transfer pump configured to transfer fluid from the first reservoir to the front and rear axles.

According to an aspect of the present disclosure, the fluid management system includes a second pump in fluid communication with the second suction line, and the second pump configured to transfer fluid from the second reservoir to the rear axle.

According to an aspect of the present disclosure, the fluid management system includes a second pump in fluid communication with the second suction line, the second reservoir in fluid communication with a front axle, and the second pump configured to transfer fluid from the front axle to the rear axle.

According to an aspect of the present disclosure, the opening in the barrier is positioned above the main suction line and near the preselected fluid level of the first reservoir.

According to an aspect of the present disclosure, the barrier includes a projection into the first reservoir, and the projection includes the opening in the barrier.

According to an aspect of the present disclosure, the fluid management system includes an overflow tube positioned in the opening in the barrier, the overflow tube having a first end positioned above the opening of the main suction line and a second end in fluid communication with the second reservoir, and the first end of the overflow tube positioned near a center of the first reservoir and near the preselected fluid level in the first reservoir.

According to an aspect of the present disclosure, a fluid management system for a drivetrain includes a transmission including a first reservoir and a second reservoir in a lower portion of the transmission, the second reservoir separated from the first reservoir by a barrier, the first reservoir having a preselected fluid level, and the barrier having an opening, a main suction line having an opening positioned in a lower portion of the first reservoir below the preselected fluid level, and a second suction line having an opening positioned in a lower portion of the second reservoir.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
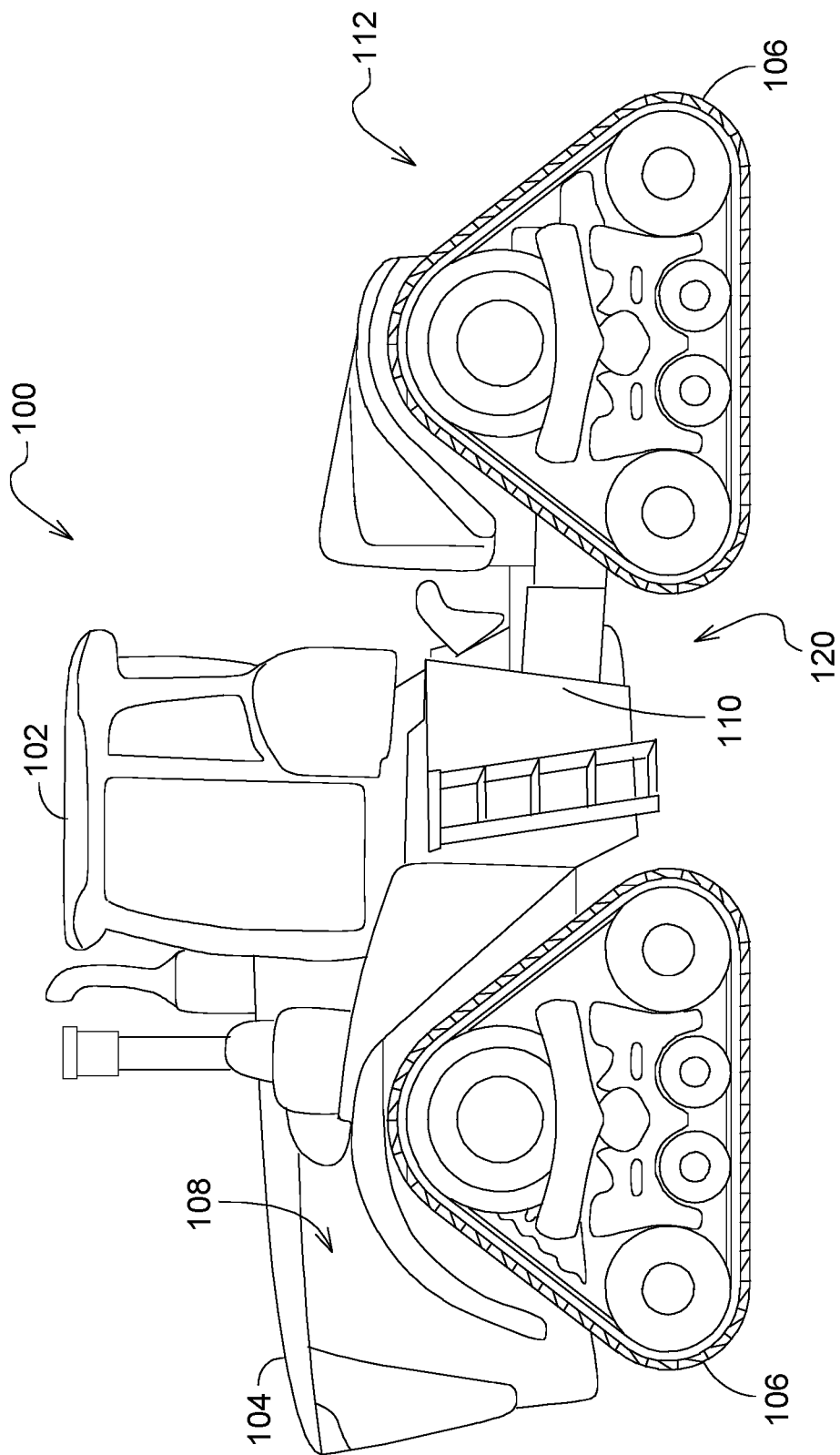
FIG. 1 is a perspective view of a work vehicle including a loader, according to an implementation.
Figure 2:
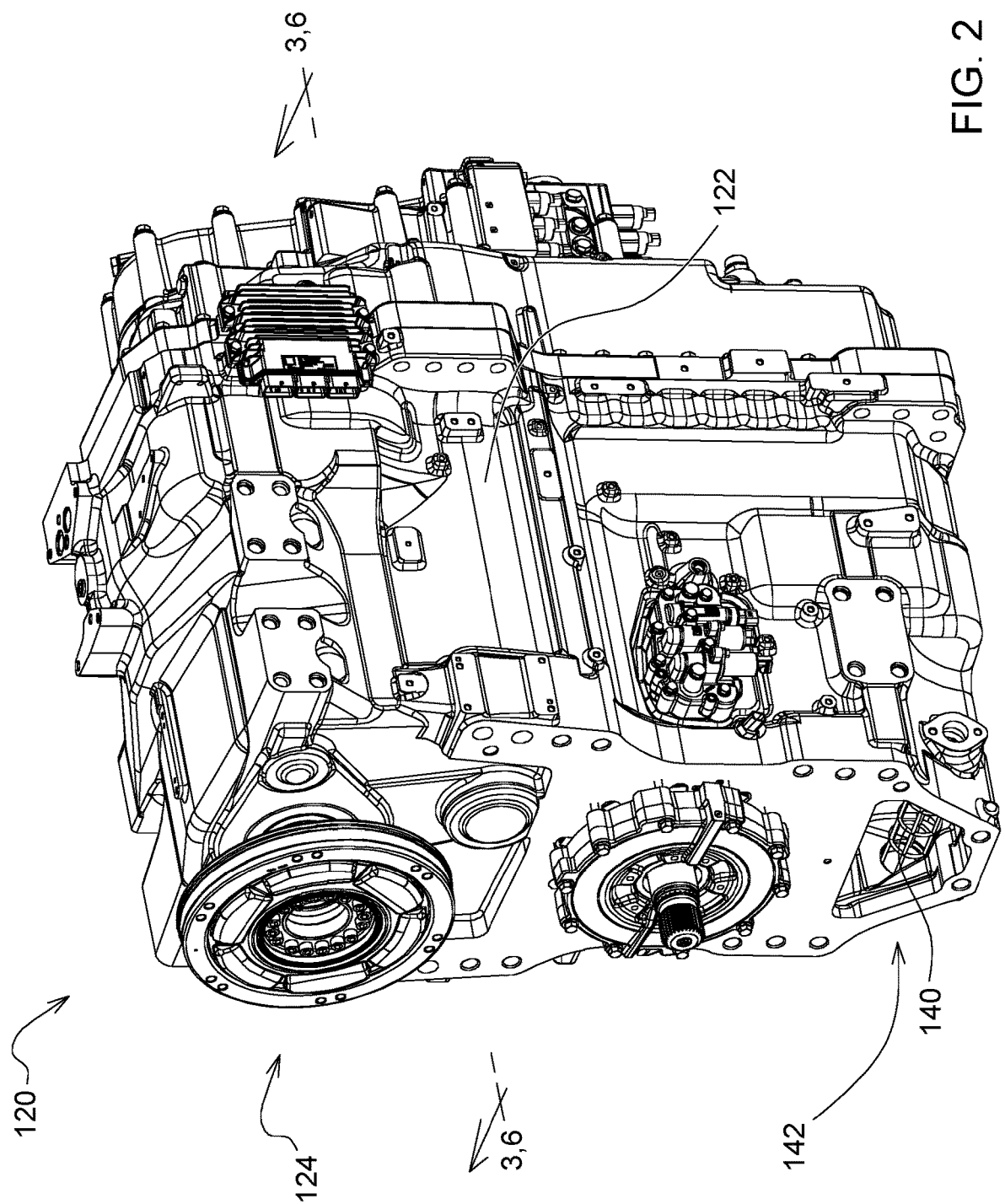
FIG. 2 is a perspective view of a transmission, according to an implementation.
Figure 3:
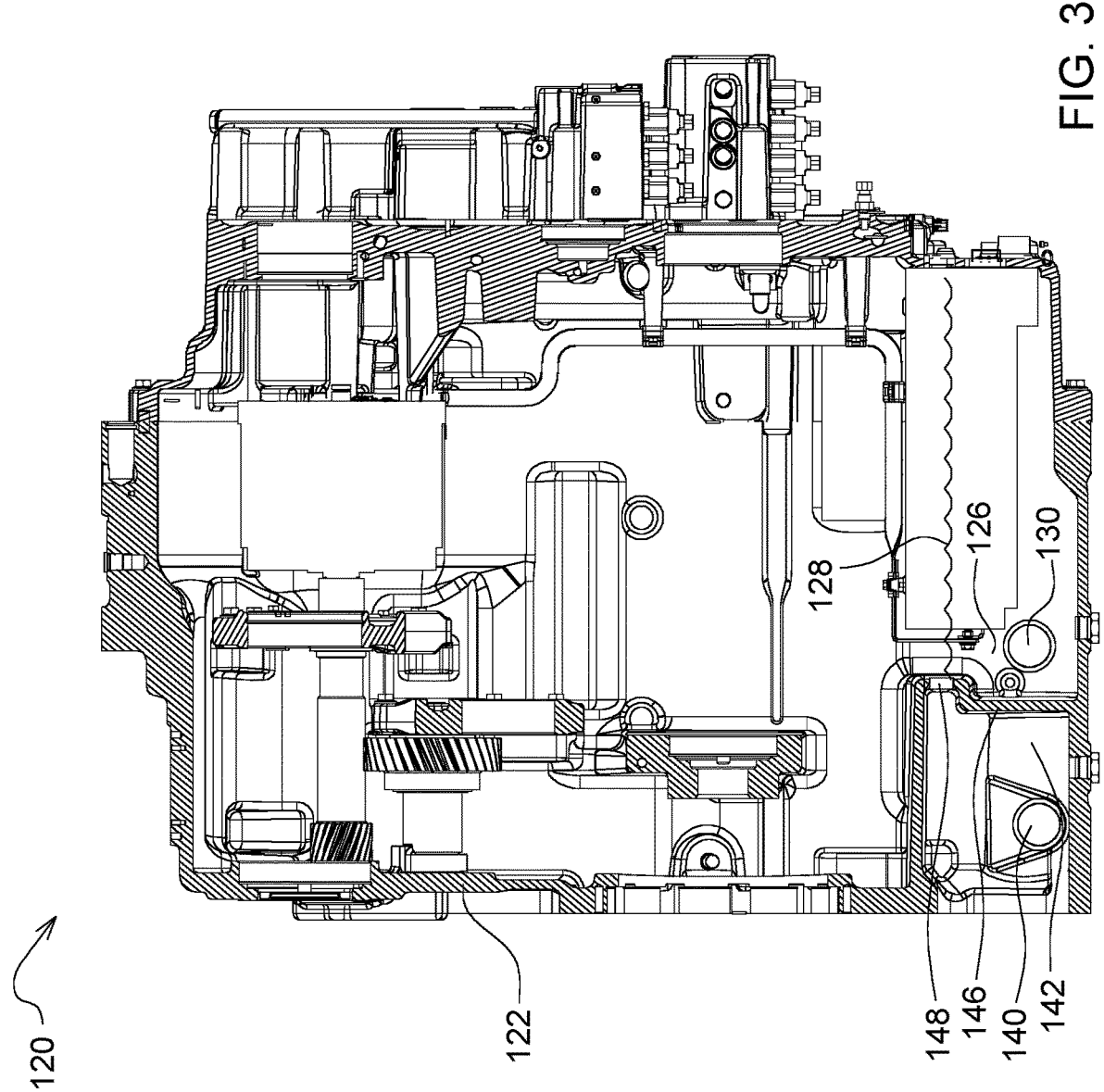
FIG. 3 is a cross-sectional view of a transmission, according to an implementation.
Figure 4:
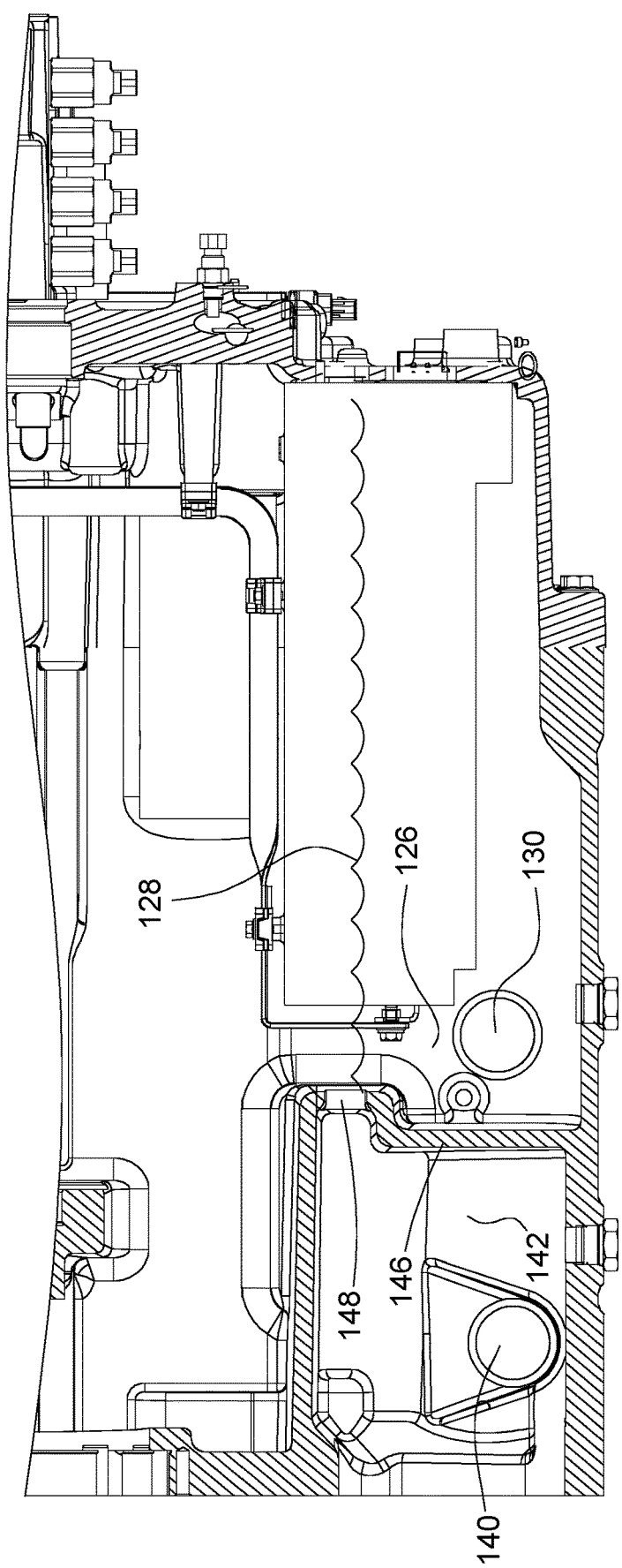
FIG. 4 is a partial cross-sectional view of a transmission, according to an implementation.
Figure 5:
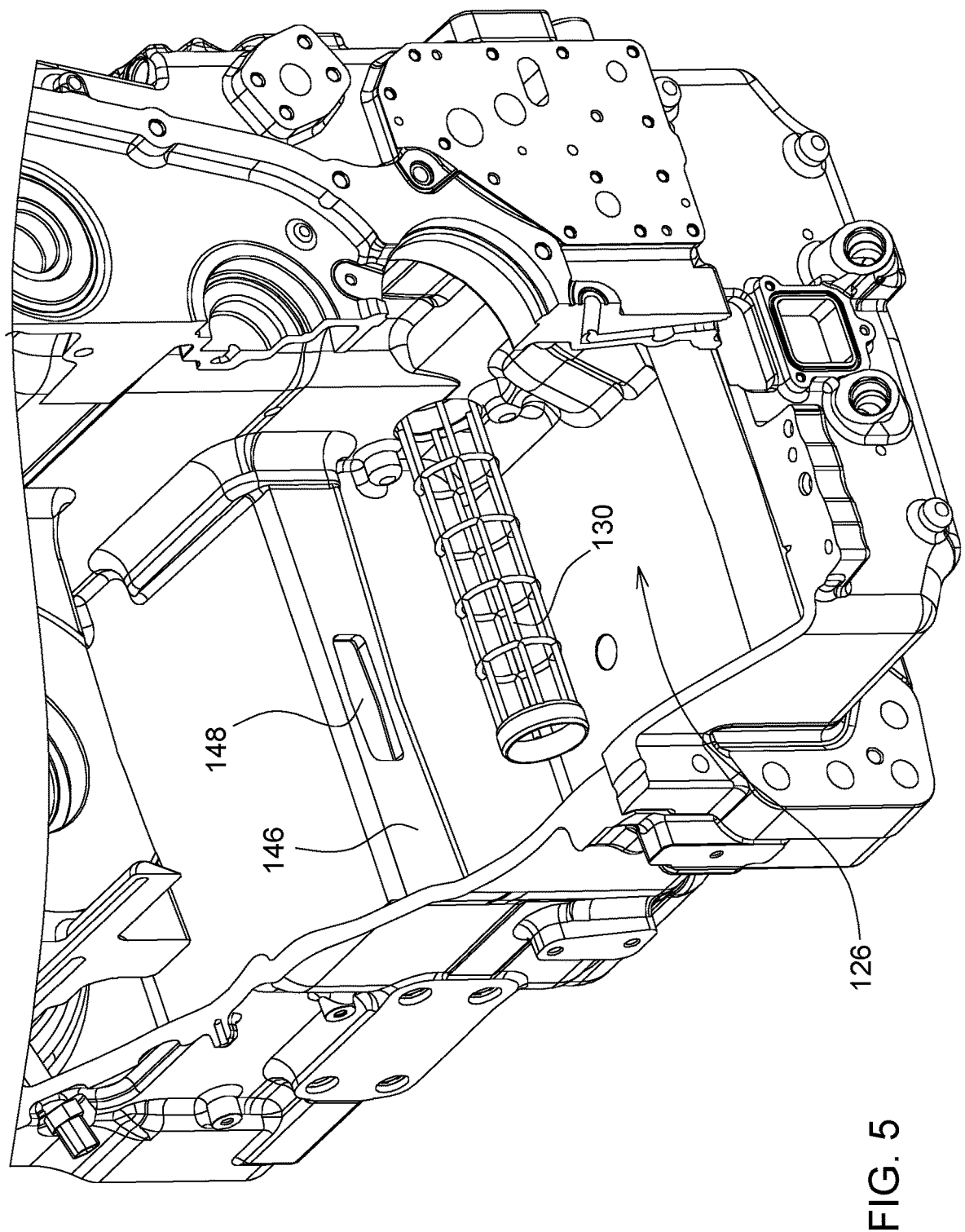
FIG. 5 is a partial cutaway view of a transmission, according to an implementation.

With reference to FIG. 1, a work vehicle 100, for example an agricultural tractor, can include an operator station or cab 102, a hood 104, one or more ground engaging apparatus 106, for example wheels or track assemblies, and a frame or chassis 110. The work vehicle 100 can include an operator interface having any number and combination of electronic devices, such as an interactive display. The work vehicle 100 can have a rigid or an articulated frame 110. The work vehicle 100 can include one or more power sources 108, for example an internal combustion engine, a hybrid engine, or an electric or hydraulic machine. The work vehicle 100 can include a transmission 120 transferring power from the one or more power sources 108 to a drivetrain, which includes the ground engaging apparatus 106 and one or more power take off (PTO) shafts 112 or other auxiliary power outputs or inputs. This disclosure also applies to other types of work vehicles in agriculture, construction, forestry, and road building.

With reference to FIGS. 2-11, the transmission 120 can include a transmission housing 122, which provides an enclosure for the various transmission or other drivetrain components. The transmission housing 122 forms an exterior surface and an interior surface of the transmission 120. The transmission 120 can include a plurality of shafts, gears, and clutches inside the transmission housing 122. One or more of the shafts or other transmission or drivetrain components may be rotatably connected to or supported by the transmission housing 122. The transmission 120 can include one or more electric machines 124, for example electric motor-generators, inside the transmission housing 122.

A fluid sump or first reservoir 126 is located or positioned in a lower portion of the transmission 120. The first reservoir 126 can include a fluid, such as a hydraulic or transmission fluid (e.g., transmission oil, hydraulic oil, or other lubricants). The first reservoir 126 can include a preselected quantity or fluid level 128. A rear axle 162 can be in fluid communication with the first reservoir 126. The PTO 112 can be in fluid communication with the rear axle 162 and the first reservoir 126. A second reservoir 142 is located or positioned in a lower portion of the transmission 120. The second reservoir 142 is separated or partitioned from the first reservoir 126 by a barrier or wall 146, which can include an opening 148. A front axle 160 can be in fluid communication with the second reservoir 142.

A main suction line 130 can be positioned in the first reservoir 126. The main suction line 130 has an opening positioned a lower portion of the first reservoir 126. The opening at one end of the main suction 130 is positioned below the preselected fluid level 128. The main suction line 130 can be fluid communication with one or more of the first reservoir 126, the front axle 160, and the rear axle 162. Alternatively, or additionally, the main suction line 130 can be fluid communication with a third reservoir 132 in fluid communication with the first reservoir 126, the front axle 160, and the rear axle 162. A transfer pump 134 (e.g., hydraulic pump) is in fluid communication with the main suction line 130. The transfer pump 134 can be in fluid communication with the first reservoir 126, the front axle 160, and the rear axle 162 to transfer fluid from the first reservoir 126 to the front axle 160 and the rear axle 162. Alternatively, or additionally, the transfer pump 134 can be in fluid communication with the third reservoir 132 to transfer fluid from the first reservoir 126 to the third reservoir 132.

A scavenge or second suction line 140 can be positioned in the second reservoir 142. The second suction line 140 has an opening positioned in a lower portion of the second reservoir 142. The opening at one end of the second suction line 140 is positioned below the preselected fluid level 128. The opening at one end of the second suction line 140 can be positioned lower than the opening in the barrier 146. The opening at one end of the second suction line 140 can be positioned below the opening in the barrier 146. The second suction line 140 can be in fluid communication with one or more of the second reservoir 142, the front axle 160, and the rear axle 162. A scavenge or second pump 144 (e.g., hydraulic pump) is in fluid communication with the second suction line 140. The second pump 144 can be in fluid communication with the second reservoir 142 and the rear axle 162 to transfer fluid from the second reservoir 142 to the rear axle 162. The second pump 144 can be in fluid communication with the front axle 160 and can remove or evacuate fluid from the front axle 160.

According to some implementations, the barrier 146 includes an opening 148 positioned near or above the preselected fluid level 128 in the first reservoir 126, as shown for example in FIGS. 3-6. The opening 148 can be positioned in an upper portion of the barrier 146. The opening 148 can be positioned above the main suction line 130. The opening 148 can provide a passageway or conduit between the first reservoir 126 and the second reservoir 142 for any fluid exceeding the preselected fluid level 128 in the first reservoir 126. The barrier 146 can include a vertical or substantially vertical portion dividing or partitioning the second reservoir 142 from the first reservoir 126. The barrier 146 can include a portion which extends or projects outwardly from the second reservoir 142 towards the first reservoir 126 and includes the opening 148, as shown for example in FIGS. 3 and 4. The opening 148 can be positioned at or near a center of the first reservoir 126. The main suction tube 130 draws or extracts a majority of the fluid from the first reservoir 126 in the transmission 120. Any fluid rising above the preselected fluid level 128 in the first reservoir 126 flows through the opening 148 into the second reservoir 142. The second suction tube 140 draws or extracts the overflow fluid from the second reservoir 142.

According to some implementations, an overflow tube 150 is positioned in an opening 148 in the barrier 146, as shown for example in FIGS. 7-11. The overflow tube 150 can provide a passageway or conduit between the first reservoir 126 and the second reservoir 142. The overflow tube 150 can be angled or inclined in a fore and aft direction, as shown for example in FIGS. 7-11. The overflow tube 150 has a first opening in a first end 152, which is positioned above the opening of the main suction line 130. The overflow tube 150 has a second opening in a second end 154, which is in fluid communication with the second reservoir 142. The first end 152 of the overflow tube 150 is positioned at or near a center of the first reservoir 126. The first end 152 of the overflow tube 150 is positioned near or above the preselected fluid level 128 in the first reservoir 126. Based on the position of overflow tube 150 in the first reservoir 126, the fluid level 128 near the first end 152 of the overflow tube 150 can remain nearly or substantially the same when the transmission 120 is tilted or inclined in a fore and aft direction, as shown for example in FIGS. 7 and 8, or a side-to-side direction, as shown for example in FIG. 10.

Figure 6:
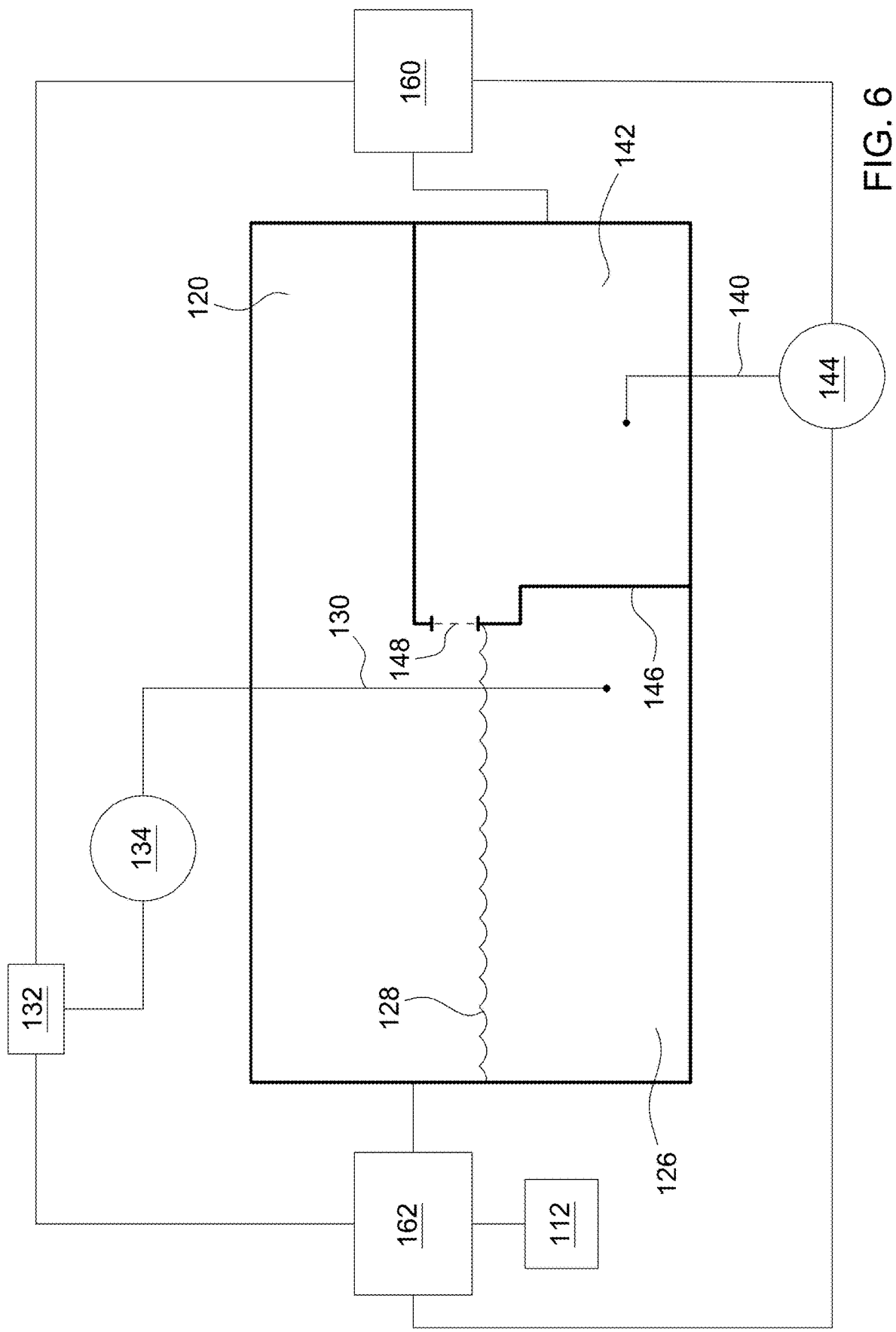
FIG. 6 is a schematic view of a fluid management system, according to an implementation.
Figure 7:
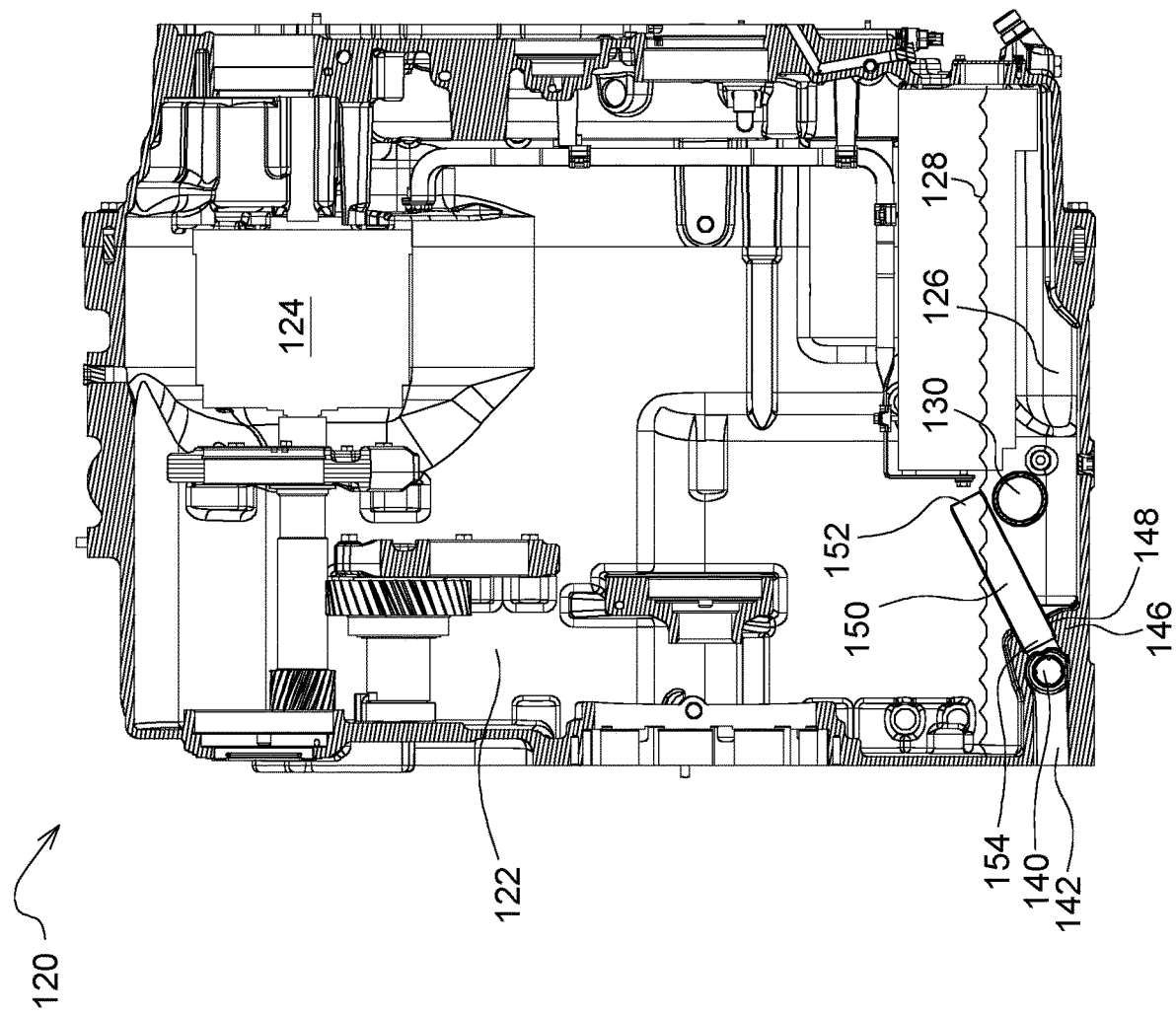
FIG. 7 is a cross-sectional view of a transmission, according to an implementation.
Figure 8:
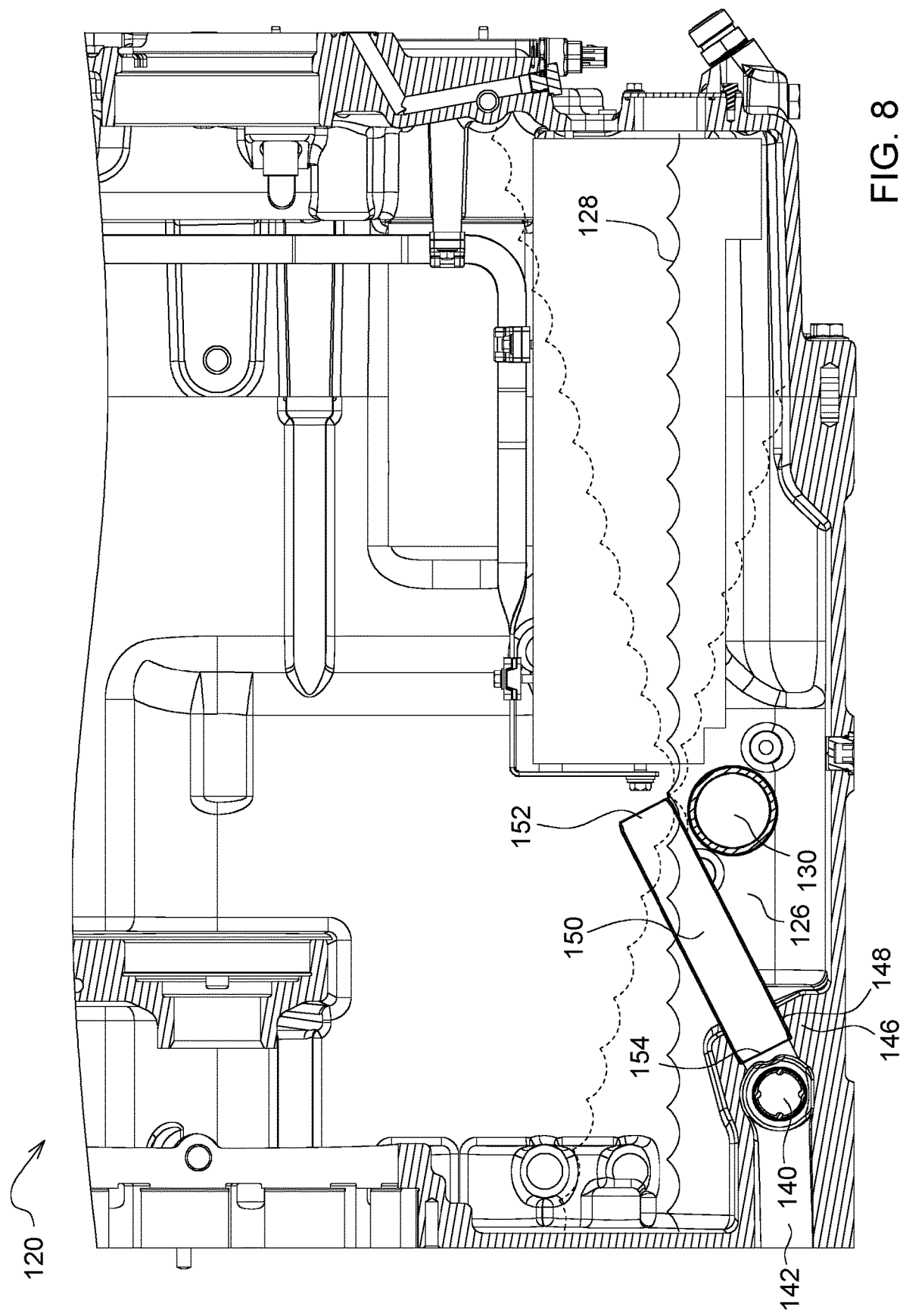
FIG. 8 is a partial cross-sectional view of a transmission, according to an implementation.
Figure 9:
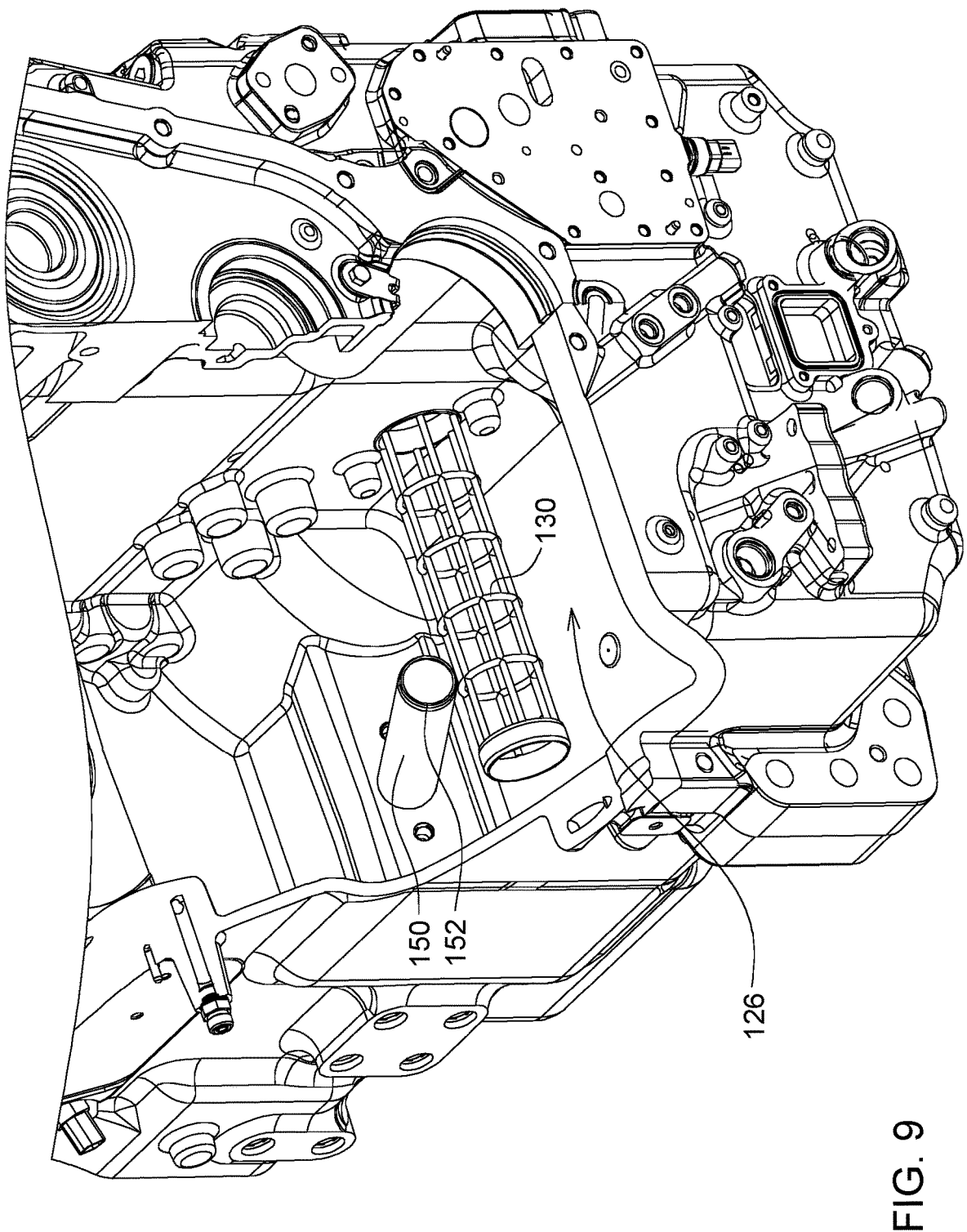
FIG. 9 is a partial cutaway view of a transmission, according to an implementation.
Figure 10:
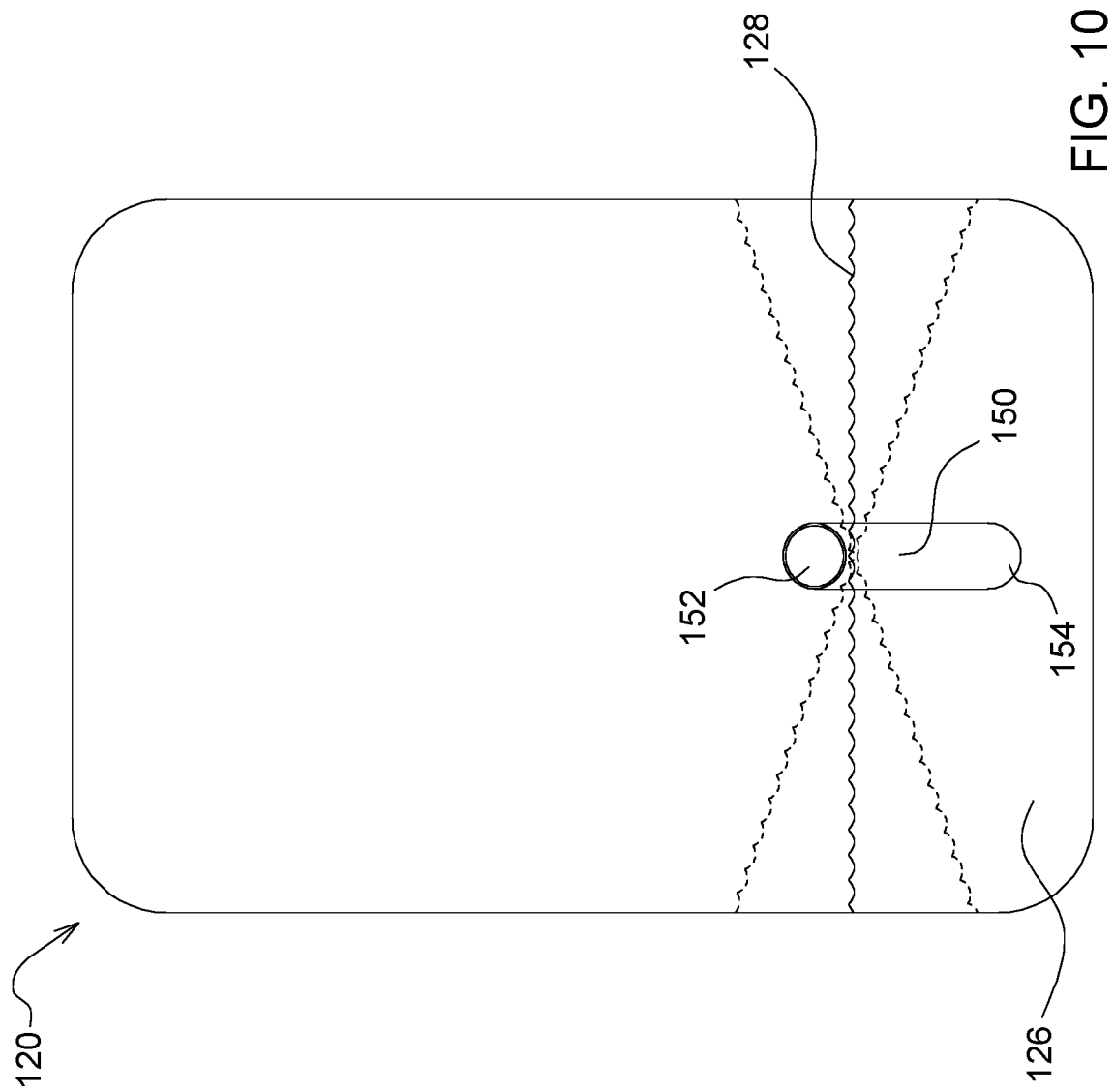
FIG. 10 is a schematic view of a transmission, according to an implementation.
Figure 11:
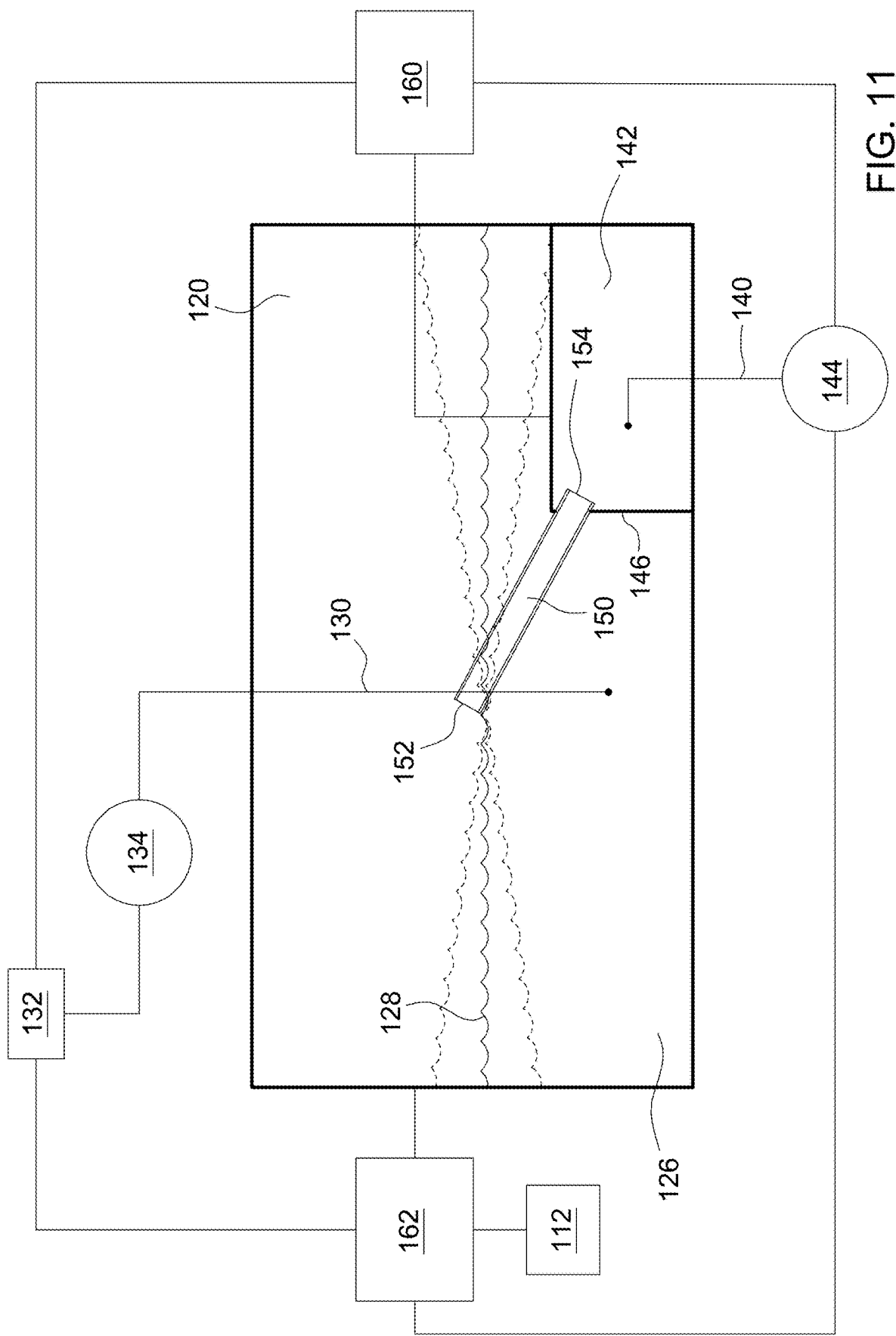
FIG. 11 is a schematic view of a fluid management system, according to an implementation.

With reference to FIGS. 6 and 11, the flow of fluid through the fluid management system can include one or more pumps, one or more drivetrain components, and one or more reservoirs. The transfer pump 134 can pump fluid from the first reservoir 126 of the transmission 120 via the main suction line 130. The transfer pump 134 can pump fluid from the first reservoir to the front and rear axles 160, 162 or to the third reservoir 132 connected to the front and rear axles 160, 162. Fluid from the rear axle 162 can flow into the first reservoir 126. Fluid from the front axle 162 can flow into the second reservoir 142. The second pump 144 can pump fluid from the second reservoir 142 to the rear axle 162. The second pump 144 can pump fluid from the front axle 160 to the rear axle 162.

During operation, the fluid in the transmission 120 or in other drivetrain components can become agitated and air can be mixed with the fluid creating aerated fluid. This fluid and air mixture rises to the top of the preselected fluid level 128 in the transmission 120 and can exceed the preselected fluid level 128. When the transmission 120 includes an opening 148 in the barrier 146, the fluid and air mixture exceeding the preselected fluid level 128 flows from the first reservoir 126 through the opening 148 in the barrier 146 into the second reservoir 142. When the transmission 120 includes an overflow tube 150 in the opening 148, the fluid and air mixture exceeding the preselected fluid level 128 flows from the first reservoir 126 through the opening 152 of the overflow tube 150 into the second reservoir 142. The second pump 144 then transfers the overflow fluid from the second reservoir 142 to the rear axle 162 or the third reservoir 132, or both.

The terminology used herein is for the purpose of describing example embodiments or implementations and is not intended to be limiting of the disclosure. As used herein, the singular forms "a," "an." and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A fluid management system for a drivetrain, comprising:
   a first reservoir positioned in a lower portion of a transmission, the first reservoir having a preselected fluid level;
   a second reservoir positioned in a lower portion of the transmission, the second reservoir separated from the first reservoir by a barrier having an opening;
   a main suction line having an opening positioned in a lower portion of the first reservoir below the preselected fluid level;
   a second suction line having an opening positioned in a lower portion of the second reservoir; and
   an overflow tube positioned in the opening of the barrier, the overflow tube having a first end positioned above the opening of the main suction line and a second end in fluid communication with the second reservoir, the first end of the overflow tube positioned at a center of the first reservoir, the first end of the overflow tube positioned at the preselected fluid level in the first reservoir, and the first end of the overflow tube positioned higher than the second end.

2. The fluid management system of claim 1, wherein the main suction line is in fluid communication with a front axle and a rear axle.

3. The fluid management system of claim 1, wherein the main suction line is in fluid communication with a third reservoir.

4. The fluid management system of claim 1, wherein the second suction line is in fluid communication with a front axle and a rear axle.

5. The fluid management system of claim 1, further comprising a transfer pump in fluid communication with the first reservoir, a front axle, and a rear axle, the transfer pump configured to transfer fluid from the first reservoir to the front and rear axles.

6. The fluid management system of claim 1, further comprising a second pump in fluid communication with the second suction line, the second pump configured to transfer fluid from the second reservoir to the rear axle.

7. The fluid management system of claim 1, further comprising a second pump in fluid communication with the second suction line, the second reservoir in fluid communication with a front axle, and the second pump configured to transfer fluid from the front axle to the rear axle.

8. The fluid management system of claim 1, wherein the overflow tube is angled in a fore and aft direction.

9. The fluid management system of claim 1, wherein the preselected fluid level near the first end of the overflow tube remains substantially the same when the transmission is tilted in one of a fore and aft direction and a side-to-side direction.

10. A fluid management system for a drivetrain, comprising:
    a transmission including a first reservoir and a second reservoir in a lower portion of the transmission, the second reservoir separated from the first reservoir by a barrier, the first reservoir having a preselected fluid level, and the barrier having an opening;
    a main suction line having an opening positioned in a lower portion of the first reservoir below the preselected fluid level;
    a second suction line having an opening positioned in a lower portion of the second reservoir; and
    an overflow tube positioned in the opening of the barrier, the overflow tube having a first end positioned above the opening of the main suction line and a second end in fluid communication with the second reservoir, the first end of the overflow tube positioned at a center of the first reservoir, the first end of the overflow tube positioned at the preselected fluid level in the first reservoir, and the first end of the overflow tube positioned higher than the second end.

11. The fluid management system of claim 10, wherein the main suction line is in fluid communication with a front axle and a rear axle.

12. The fluid management system of claim 10, wherein the main suction line is in fluid communication with a third reservoir.

13. The fluid management system of claim 10, wherein the second suction line is in fluid communication with a front axle and a rear axle.

14. The fluid management system of claim 10, further comprising a transfer pump in fluid communication with the first reservoir, a front axle, and a rear axle, the transfer pump configured to transfer fluid from the first reservoir to the front and rear axles.

15. The fluid management system of claim 10, further comprising a second pump in fluid communication with the second suction line, the second pump configured to transfer fluid from the second reservoir to the rear axle.

16. The fluid management system of claim 10, further comprising a second pump in fluid communication with the second suction line, the second reservoir in fluid communication with a front axle, and the second pump configured to transfer fluid from the front axle to the rear axle.

17. The fluid management system of claim 10, wherein the overflow tube is angled in a fore and aft direction.

18. The fluid management system of claim 10, wherein the preselected fluid level near the first end of the overflow tube remains substantially the same when the transmission is tilted in one of a fore and aft direction and a side-to-side direction.

* * * * *